No. 679,704. Patented July 30, 1901.
H. & A. RUSH.
HORSESHOE.
(Application filed Apr. 15, 1901.)
(No Model.)
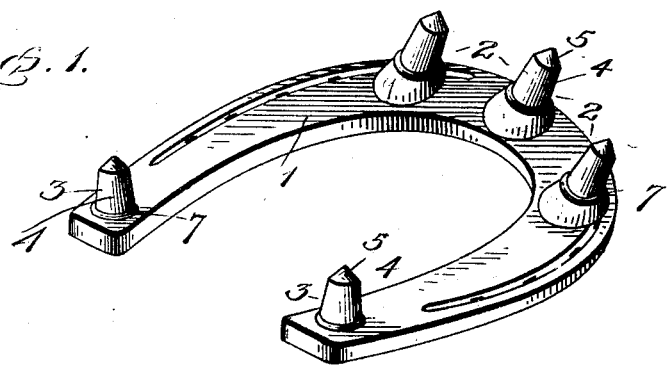
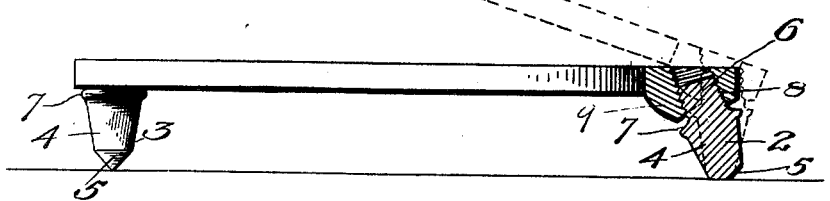
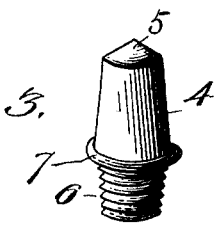
Witnesses:
Inventors:
H. Rush
A. Rush
By H. B. Willson & Co
Attorneys

UNITED STATES PATENT OFFICE.

HENRY RUSH AND ANDREW RUSH, OF RIMERTON, PENNSYLVANIA; SAID ANDREW RUSH ASSIGNOR TO SAID HENRY RUSH.

HORSESHOE.

SPECIFICATION forming part of Letters Patent No. 679,704, dated July 30, 1901.

Application filed April 15, 1901. Serial No. 55,879. (No model.)

*To all whom it may concern:*

Be it known that we, HENRY RUSH and ANDREW RUSH, citizens of the United States, residing at Rimerton, in the county of Armstrong and State of Pennsylvania, have invented certain new and useful Improvements in Horseshoes; and we do declare the following to be a full, clear, and exact description of the invention, such as will enable others skilled in the art to which it appertains to make and use the same.

This invention relates to horseshoes, and has for its object the production of a horseshoe and calks therefor of novel construction, whereby slipping on smooth pavements and icy roads will be effectually prevented, a firmer hold upon the ground secured, and a secure connection of the calks effected.

With these and other objects in view, which will appear as the nature of the invention is better understood, the invention consists in a horseshoe embodying certain novel features of construction, combination, and arrangement of parts, as will be hereinafter more fully described, and particularly pointed out in the appended claim.

In the accompanying drawings, Figure 1 is a bottom perspective view of a horseshoe constructed in accordance with our invention. Fig. 2 is a central vertical longitudinal section through the shoe, showing in full and broken lines the normal position of the shoe and the inclined position which the shoe takes when the horse is pulling or traveling uphill and inclines the hoof to bring the toe down first and secure a firmer hold; and Fig. 3 is a perspective view of one of the calks.

Referring now more particularly to the drawings, the numeral 1 represents a horseshoe of the usual form, which, in accordance with our invention, is provided with removable toe-calks 2 and heel-calks 3. These calks each consist of a tapered body portion 4, terminating in a pointed end 5 and having a tapered screw-threaded shank 6 and a beveled shoulder 7 at the base of said shank. The screw-threaded shanks enter threaded orifices 8, formed in the shoe, and thereby secure the calks to the shoe.

In accordance with our invention the threaded orifices 8 at the toe portion of the shoe are inclined or diagonally disposed, and the toe-calks are fitted therein so as to project forwardly at substantially an acute angle to the shoe when the latter is disposed in its normal horizontal position. By thus causing the toe-calks to project forwardly at an angle to the shoe a decided advantage in securing a firm bearing on the ground is secured over shoes of that kind in which the toe-calks extend perpendicularly from the bottom of the shoe. This will be readily understood from the fact that as a horse in pulling or traveling uphill increases the foothold by first bringing the toe of the hoof in contact with the ground and then bringing the heel down solid the inclination of the shoe caused by this movement of the hoof will bring the inclined toe-calks of our improved shoe to a vertical or substantially vertical position, so that the points thereof will bear squarely against the surface of the pavement or sink into the ground, thereby enabling the horse to get a firmer hold, preventing slipping, and rendering it easier for a horse to pull a heavy load. In the ordinary construction of shoe, wherein the toe-calks project straight downward from the shoe, the inclination of the shoe when the horse inclines his hoof to bring the toe down first throws the calks at a rearward angle, whereby a firm hold upon the surface of a pavement or upon the ground cannot be secured.

In order to reinforce the toe-calks and to render them self-sustaining, we provide the under side of the shoe around the greater portion of the surface of the threaded orifices 8 at the toe with bosses 9, which permit of the orifices being made longer than usual and act as shoulders or bearing-surfaces, forming a firmer foundation for the calks and reinforcing them against strain. By the provision of these bosses we are also enabled to make the tapered threaded shanks of the calks of greater length than ordinarily, so as to render their connection more certain and secure. The purpose of tapering the said threaded shanks of the toe-calks is to provide for the perfect fitting of the calks to the shoe. After two or more sets of calks have been used upon the shoe the threaded orifices become worn and enlarged, and the next set of calks applied thereto will not fit tight; but as the threaded shanks of the calks are tapered and are of less length than the orifices it will be understood that by simply screwing the shanks in farther a tight fit may be secured, and to more effectually enable this to be done we taper or bevel the upper surface of the shoulder 7 to adapt the same to closely fit the outer end of the orifice at all times, but to move in and out of the same in case of wear to compensate for the deeper insertion within the orifice of the shank. The bosses 9 also adapt the calks to be worn down to a greater extent than shoes of ordinary construction and to be removed without difficulty.

The heel-calks extend straight down or at right angles to the shoe to afford a firm bearing on the surface of the pavement or ground when the heel of the hoof is brought down into bearing position.

From the foregoing description, taken in connection with the accompanying drawings, the construction, mode of operation, and advantages of our invention will be readily understood, and it will be seen that it provides a shoe which is simple in construction and in which provision is made for the firm attachment of the calks and their use in securing a firm bearing upon the surface of a pavement or ground to increase the foothold and prevent slipping.

Changes in the form, proportion, and minor details of construction may be made within the scope of the invention without departing from the spirit or sacrificing any of the advantages thereof.

Having thus fully described our invention, what we claim as new, and desire to secure by Letters Patent, is—

A horseshoe having threaded orifices at its toe and heel portions, the toe-orifices being obliquely arranged and the heel-orifices right-angularly arranged, and reinforcing-bosses upon the toe and having the said oblique orifices extending therethrough, combined with calks provided with tapered body portions having tapered threaded shanks fitted within said orifices and beveled or inclined shoulders at the bases of said shanks, the heel-calks being arranged at right angles to the shoe and the toe-calks projecting at a forward inclination, substantially as described.

In testimony whereof we have hereunto set our hands in presence of two subscribing witnesses.

H. RUSH.
A. RUSH.

Witnesses:
G. WOODRING,
P. E. HEFFNER.